(12) United States Patent
Iwashita et al.

(10) Patent No.: US 7,165,577 B2
(45) Date of Patent: Jan. 23, 2007

(54) CLEANING VALVE DRIVE UNIT

(75) Inventors: Hiroyuki Iwashita, Nagano (JP);
Tsuyoshi Nakasone, Nagano (JP);
Katsunori Tomita, Aichi (JP);
Takanori Idota, Aichi (JP); Hironao Inoue, Aichi (JP)

(73) Assignee: Nidec Sankyo Corporation & Inax Corporation, Aichi (JP)

( * ) Notice: Subject to any disclaimer, the term of this patent is extended or adjusted under 35 U.S.C. 154(b) by 343 days.

(21) Appl. No.: 10/727,045

(22) Filed: Dec. 4, 2003

(65) Prior Publication Data
US 2004/0244849 A1  Dec. 9, 2004

(30) Foreign Application Priority Data
Dec. 4, 2002 (JP) ............................ P2002-352258

(51) Int. Cl.
*F16K 31/53* (2006.01)
(52) U.S. Cl. ..................... 137/624.13; 4/324
(58) Field of Classification Search ........... 137/624.13; 4/324
See application file for complete search history.

(56) References Cited

U.S. PATENT DOCUMENTS

| 4,141,092 A | 2/1979 | Jones |
| 4,149,283 A | 4/1979 | Knudtson |
| 6,543,066 B2 * | 4/2003 | Tomita et al. .................. 4/249 |

* cited by examiner

*Primary Examiner*—Kevin Lee
(74) *Attorney, Agent, or Firm*—Sughrue Mion, PLLC

(57) ABSTRACT

A cleaning valve drive unit constituted to be able to supply water to a toilet by manual rotational operation of a main shaft in which the main shaft is constituted to be able to pull out from a cleaning operation position to a draining operation position. Whereas an operation limiting mechanism with respect to the main shaft enables to carry out cleaning operation to the toilet by rotational operation around an axis line with respect to the main shaft when the main shaft is disposed at the cleaning operation position, when the main shaft is moved to the draining operation position, the operation limiting mechanism permits to drain water by the rotational operation around the axis line with respect to the main shaft.

5 Claims, 6 Drawing Sheets

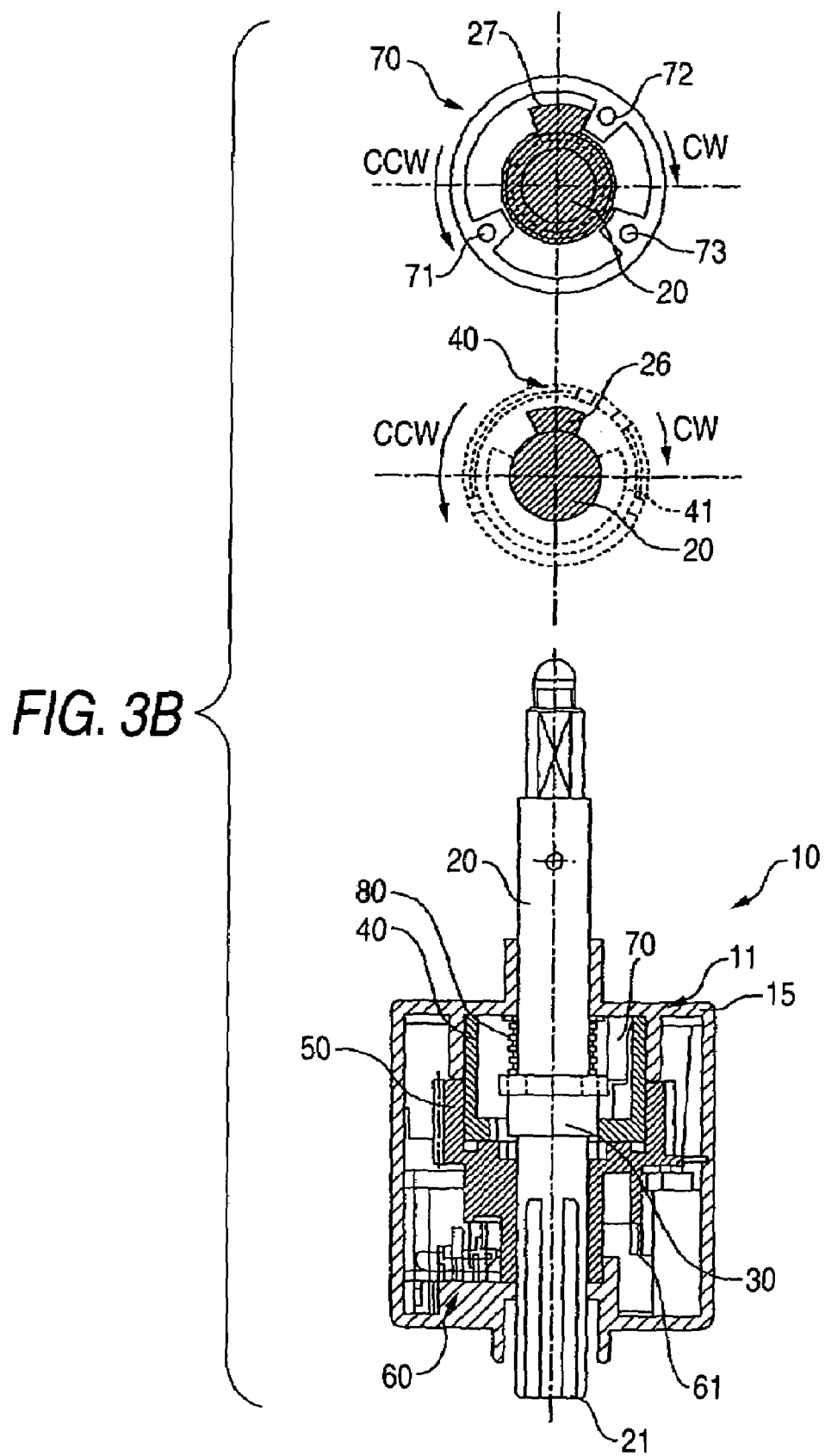

CLEANING VALVE DRIVE UNIT

The present application is based on Japanese Patent Application No. 2002-352258, the entire contents of which are incorporated herein by reference.

BACKGROUND OF THE INVENTION

1. Field of the Invention

The present invention relates to a cleaning valve drive unit using a cleaning water supply apparatus for delivering and supplying cleaning water into a toilet.

2. Related Art

Conventionally, as shown by FIGS. 4A and 4B, a cleaning valve drive unit for driving an automatic flush valve for cleaning inside of a toilet by supplying cleaning water into the toilet includes a valve (not illustrated) for opening and closing a supply port of cleaning water, a cam mechanism (not illustrated) for driving the valve, a main shaft 20 (handle shaft) for transmitting rotational force to the cam mechanism, a gear train for driving the main shaft 20 (only a spur gear 50 is illustrated) and a motor unit (not illustrated) for driving to rotate the main shaft 20 via the gear train for supplying cleaning water into the toilet by driving the main shaft 20 by controlling the motor unit by switching operation. Further, the main shaft 20 is connected with a handle 25 and by rotating the main shaft 20 in a cleaning operation direction (counterclockwise direction/direction of arrow mark CCW) by manually operating the handle 25, cleaning can be carried out manually without depending on the switching operation.

Further, when the main shaft 20 is rotated in a draining operation direction (clockwise direction/direction of arrow mark CW) via the handle 25, water can be drained from the cleaning water supply apparatus. Therefore, when a stopcock is shut while draining, water can be drained and therefore, freezing of water can be prevented in winter season.

However, according to the cleaning valve drive unit of the related art, when a person who does not know a method of using the drive unit leaves the site while the handle 25 is left to be erroneously turned in the draining direction (clockwise direction/direction of arrow mark CW), there poses a problem that cleaning water is left to flow.

SUMMARY OF THE INVENTION

In view of the above-described problem, it is a problem of the invention to provide a cleaning valve drive unit capable of firmly preventing water from being left to flow by carrying out operation without fail.

In order to resolve the above-described problem, according to the invention, there is provided a cleaning valve drive unit in a cleaning water supply apparatus which supplies water to a toilet, comprising:

a main shaft operated by a manual rotational operation, the main shaft being movable to a cleaning operation position and a draining operation position which is set to a position of being pulled out or pushed from the cleaning operation position in an axial direction of the main shaft; and an operation limiting mechanism for limiting the operation to the main shaft;

wherein the operation limiting mechanism enables to rotate the main shaft by the rotational operation around an axis line of the main shaft to thereby clean the toilet while a draining operation to the main shaft is not able to be carried out, when the main shaft is disposed at the cleaning operation position, and the operation limiting mechanism enables to rotate the main shaft by the rotational operation around the axis line of the main shaft to thereby drain water from the toilet when the main shaft is disposed at the draining operation position.

According to the invention, the draining operation for draining water cannot be carried out so far as the operation of pulling out the main shaft from the cleaning operation position in the axis line direction or the operation of pushing the main shaft therefrom. Therefore, so far as the main shaft is disposed at the cleaning operation position, even when a person who does not know the method of use erroneously turns the handle, the draining operation is not carried out and therefore, cleaning water is not left to flow.

According to the invention, it is preferable that the operation limiting mechanism is configured so that the cleaning operation to the main shaft cannot be carried out when the main shaft is disposed at the draining operation position.

According to the invention, it is preferable that the operation limiting mechanism includes a projection integrally rotated with the main shaft and a stopper for limiting rotation around the axis line of the main shaft in cooperation with the projection, and an operation other than a predetermined operation to the main shaft is limited by the projection and the stopper.

According to the invention, it is preferable to include an urging device urging the main shaft in the axial direction thereof to thereby return the main shaft from the draining operation position to the cleaning operation position. When constituted in this way, the main shaft is automatically returned from the draining operation position to the cleaning operation position, further, impact sound is emitted when the main shaft is returned and therefore, the operator can be informed of the returning operation.

BRIEF DESCRIPTION OF THE DRAWINGS

FIGS. 3A and 3B are respectively an explanatory view when the main shaft is disposed at a draining operation position in the cleaning valve drive unit to which the invention is applied and an explanatory view of a state of turning the main shaft in a draining direction when the main shaft is disposed at the draining operation position.

DETAILED DESCRIPTION OF THE PREFERRED EMBODIMENTS

An explanation will be given of a cleaning valve drive unit for a cleaning water supply apparatus of a toilet to which the invention is applied in reference to drawings as follows.

Figure 1A:
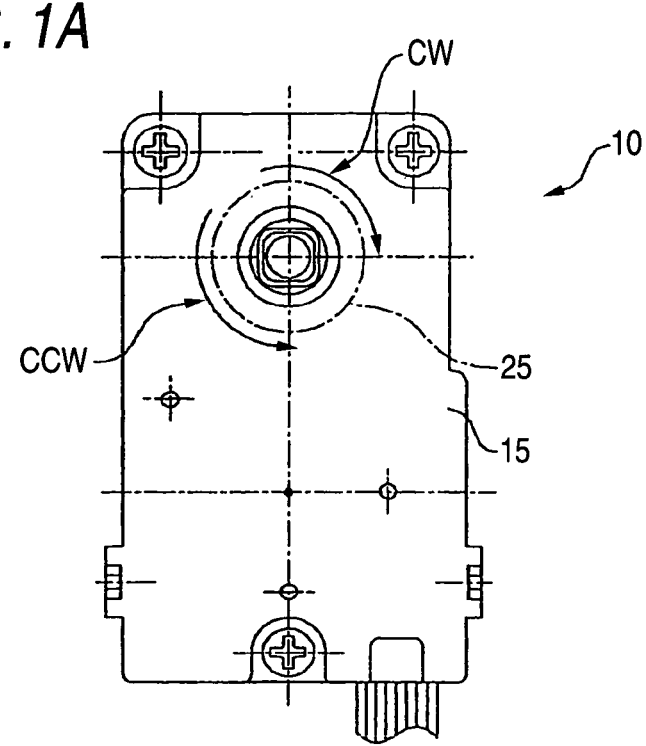
FIGS. 1A and 1B illustrates an outlook views of a cleaning valve drive unit to which the invention is applied and a sectional view showing an inner structure thereof.
Figure 1B:
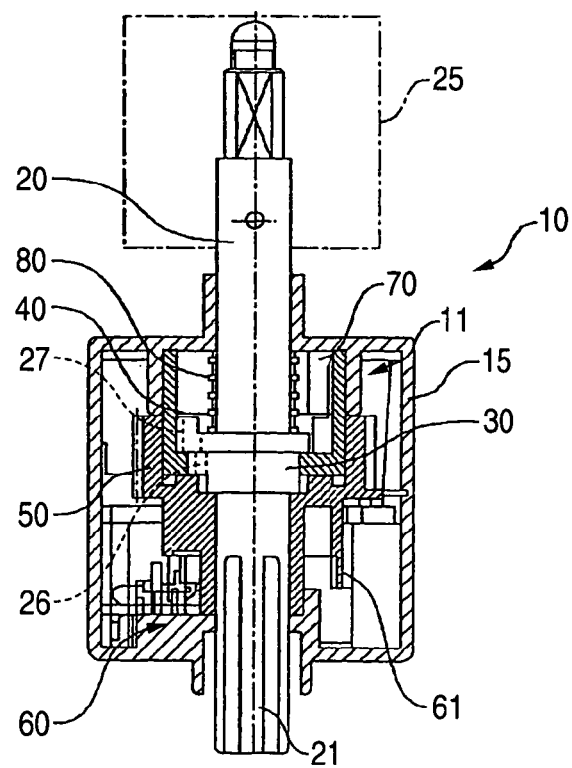

FIGS. 1A and 1B show an outlook view of a cleaning valve drive to which the invention is applied and a section showing an inner mechanism thereof.

As shown by FIGS. 1A and 1B, a cleaning valve drive unit 10 according to the invention is for an automatic flush valve for cleaning inside of a toilet by supplying cleaning water into the toilet and includes a valve (not illustrated) for opening and closing a supply port of cleaning water, a cam mechanism (not illustrated) for driving the valve, a main shaft 20 (handle shaft) for transmitting rotational force to the cam mechanism, a gear train (only a spur gear 50 is illustrated) for driving the main shaft 20 and a motor unit (not illustrated) for driving to rotate the main shaft 20 via the gear train and cleaning water is delivered and supplied into the toilet by driving the main shaft 20 by controlling the motor unit by switching operation. Among the parts, mechanism parts arranged around the main shaft 20 are contained at inside of a substantially rectangular case 15.

A spline groove 21 is formed at one end portion of the main shaft 20 and the cam mechanism for driving the valve is connected to fit to the spline groove 21. Further, among a plurality of gears constituting the gear train, the spur gear 50 is fixedly attached to the main shaft 20 and the main shaft 20 is transmitted with the rotational drive force from the motor unit via the spur gear 50.

In the cleaning valve drive unit 10 of the embodiment, other end of the main shaft 20 is connected with a handle 25 and when the handle 25 is manually rotated in a water supplying direction (counterclockwise/arrow mark CCW direction), the main shaft 20 brings the valve into a fully opened state and cleaning water is supplied into the toilet by a predetermined pattern (cleaning mode). Further, when the main shaft 20 is operated as described later, the valve is brought into a state of continuously draining cleaning water to thereby enable to drain water (draining mode).

(Constitution of Manual Operation Limiting Mechanism)

Figure 2A:
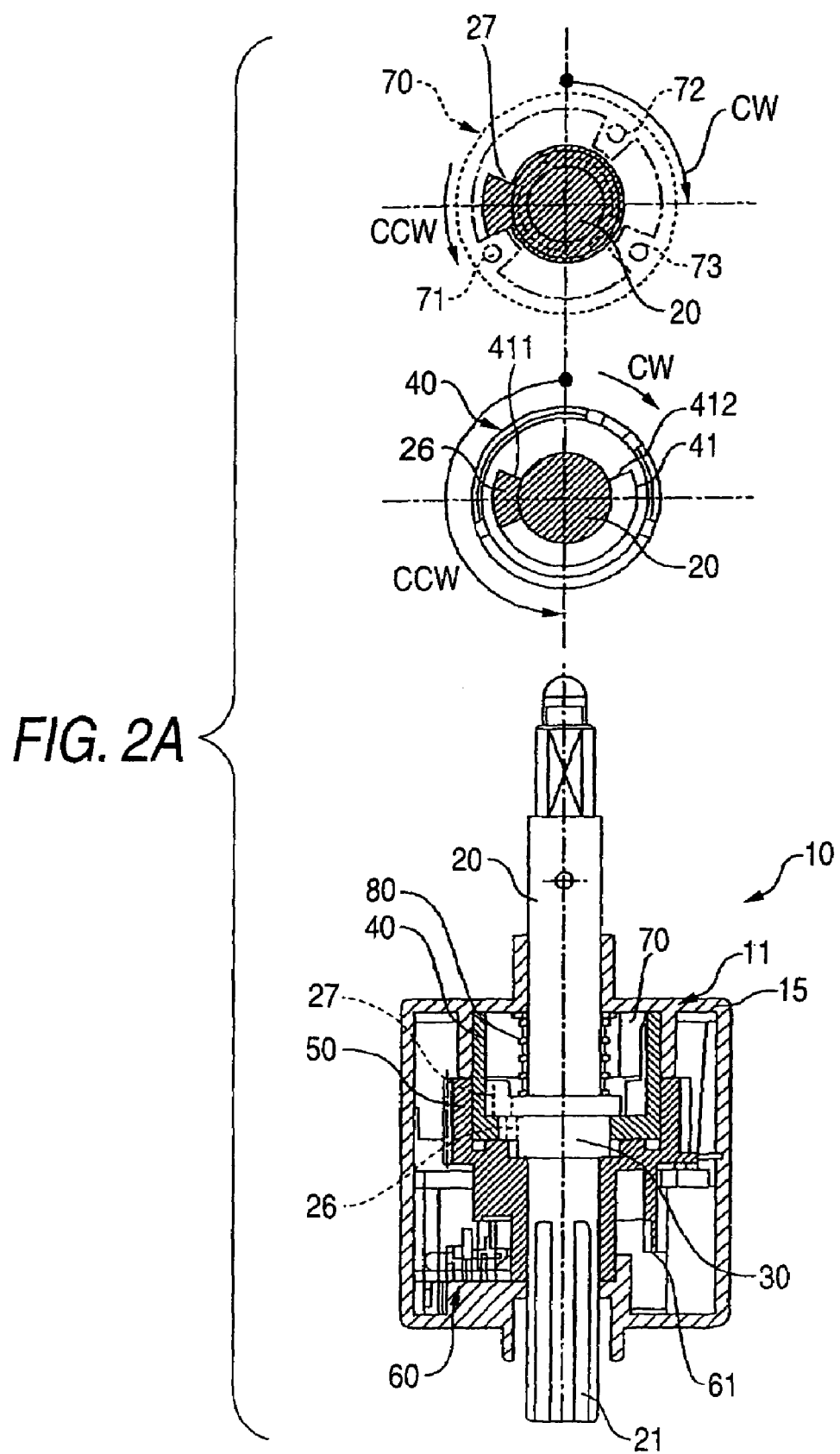
FIGS. 2A and 2B are respectively an explanatory view when a main shaft is disposed at a cleaning operation position in the cleaning valve drive unit to which the invention is applied and an explanatory view of a state of turning the main shaft in a cleaning direction when the main shaft is disposed at the cleaning operation position.
Figure 2B:
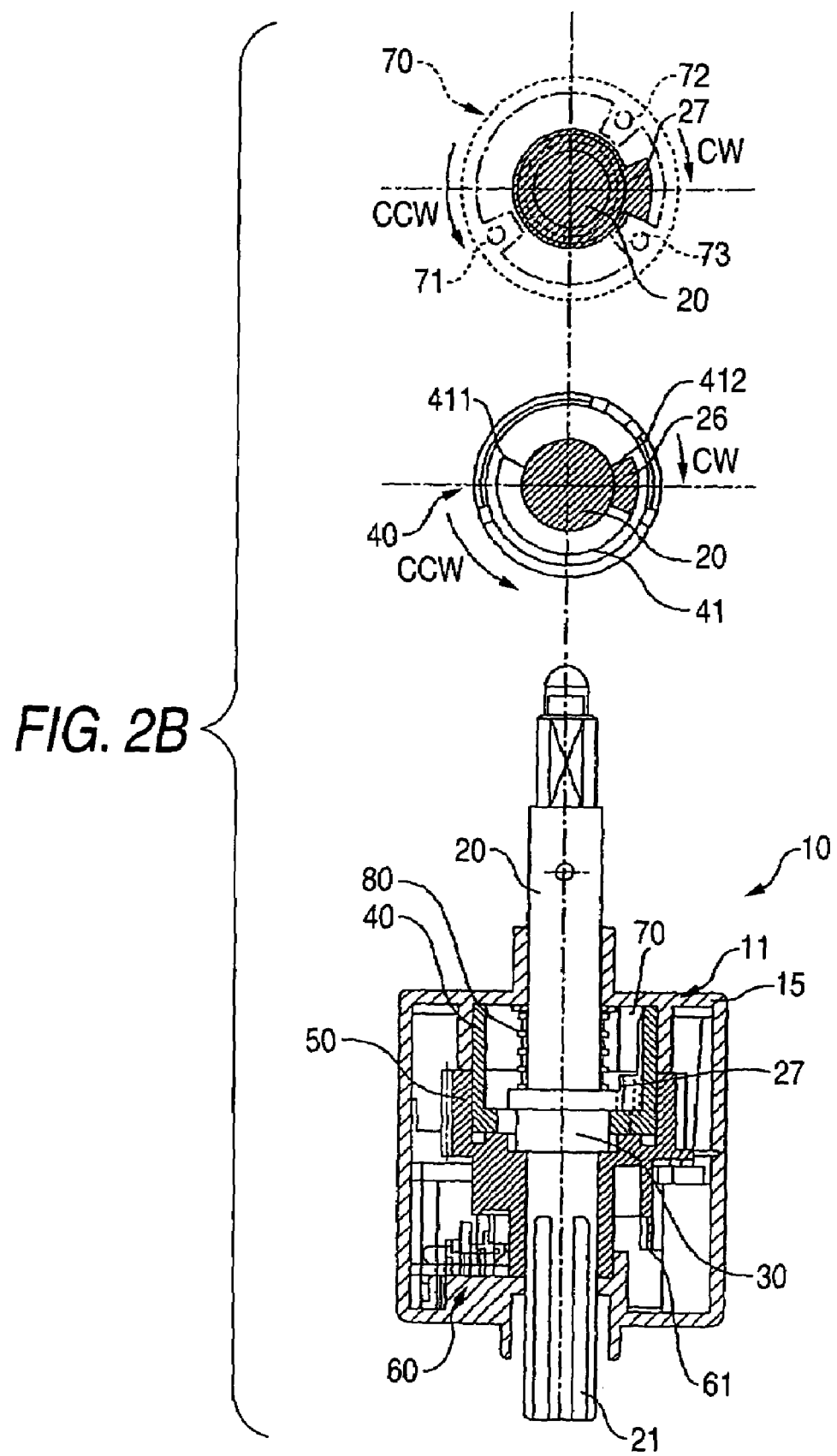
Figure 3A:
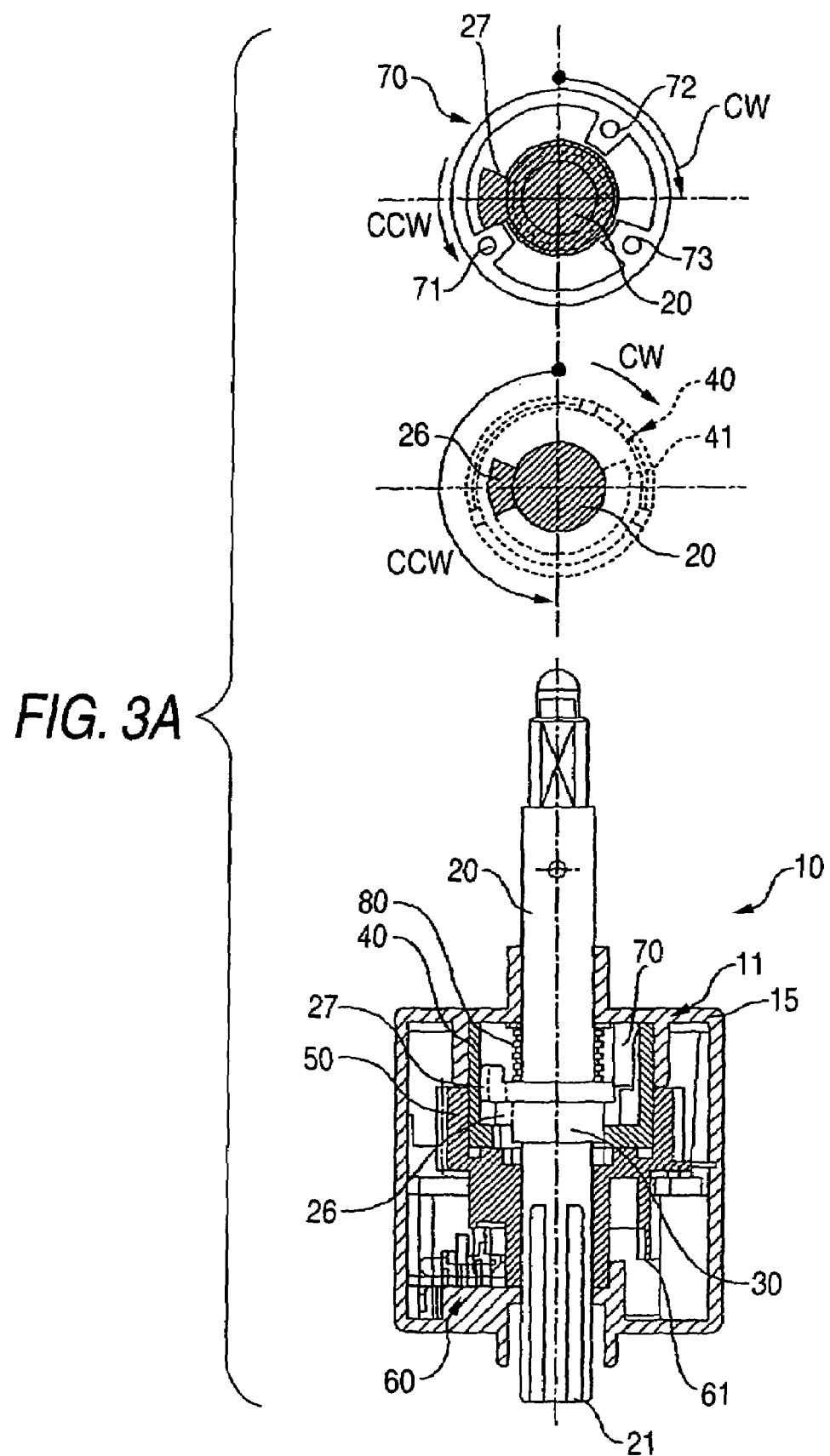
Figure 4A:
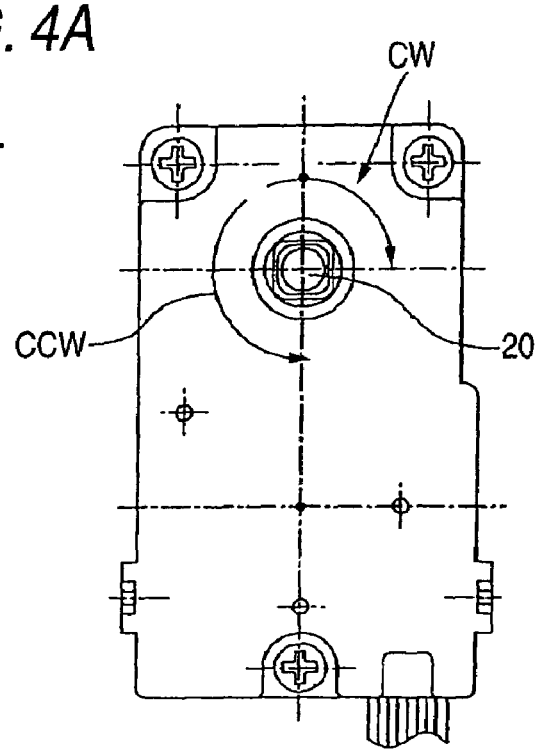
FIGS. 4A and 4B illustrate outlook views of a cleaning valve drive unit of a related art and a sectional view showing an inner mechanism thereof.
Figure 4B:
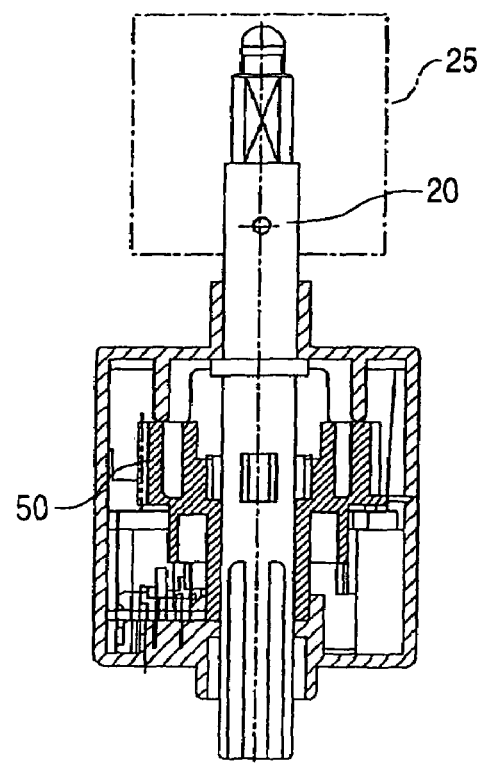

FIGS. 2A and 2B are respectively an explanatory view when the main shaft is disposed at a cleaning operation position in a cleaning valve drive unit to which the invention is applied and an explanatory view of a state in which the main shaft is turned to a cleaning direction when the main shaft is disposed at the cleaning operation position. FIGS. 3A and 3B are respectively an explanatory view when the main shaft is disposed at a draining operation position in the cleaning valve drive unit to which the invention is applied and an explanatory view of a state in which the main shaft is turned to a draining direction when the main shaft is disposed at the draining operation position.

An operation limiting mechanism 11 for limiting manual operation with respect to the main shaft 20 is constituted at the cleaning valve driving unit 10 of the embodiment in order to prevent error of manual operation.

As the operation limiting mechanism 11, according to the embodiment, first, the main shaft 20 is arranged at inside of the case 15 in a state of being movable to the cleaning operation position set in an axial direction and the draining operation position constituted by pulling out the main shaft 20 from the cleaning operation position and from the case 15 and FIG. 1B and FIGS. 2A and 2B show a state in which the main shaft 20 is disposed at the cleaning operation position.

Here, the main shaft 20 is fixedly attached with a ring member 30 substantially at a central portion in a length direction thereof, a first handle side rib 26 is formed from the ring member 30 to an outer peripheral side and a second handle side rib 27 further extended to the outer peripheral side is constituted at a position contiguous to the first handle side rib 26 in the axial direction.

Meanwhile, a holder 40 is arranged around the main shaft 20 and the holder 40 is fixed to the case 15. Here, the holder 40 is formed with a groove 41 in a shape of a circular arc and inside of the groove 41 in the circular arc shape is brought into a state of being fitted with the first handle side rib 26.

Therefore, in a state shown by FIG. 2A, when the main-shaft 20 is rotated in the counterclockwise direction (arrow mark CCW direction/cleaning operation direction) as shown by FIG. 2B, the main shaft 20 can be rotated until the first handle side rib 26 is rotated in the counterclockwise direction at inside of the groove 41 to butt to an inner wall 412 disposed in the counterclockwise direction of the groove 41.

In contrast thereto, in a state shown in FIG. 2A, when he main shaft 20 is intended to rotate in the clockwise direction (arrow mark CW direction/draining operation direction) by operating the handle 25, since the first handle side rib 26 is butted to an inner wall 411 disposed in the clockwise direction in the groove 41, rotation of the handle 25 and the main shaft 20 in the clockwise direction (arrow mark CW direction) is limited.

Further, the case 15 is attached with a ring member 70 and the ring member 70 is formed with three pieces of case side ribs 71, 72 and 73. However, positions of the second handle side rib 27 and the case side ribs 71, 72 and 73 are slightly shifted from each other in the axial direction in a state shown by FIG. 2A.

However, when the handle 25 is pulled from the state shown by FIG. 2A and the shaft 20 is moved slightly in a direction of pulling out the shaft 20 from inside of the case 15, by, for example, about 3 mm as shown by FIG. 3A, the first handle side rib 26 is drawn out from the groove 41 and therefore, rotation of the main shaft 20 is released from the groove 41 however, the second handle ride rib 27 and the case side ribs are brought into a state of capable of interfering with each other. Therefore, in a state shown in FIG. 3A, even when the main shaft 20 is intended to rotate in the counterclockwise direction (CCW direction/cleaning operation direction) by operating the handle 25, the second handle side rib 27 is butted to the case side rib 71 and therefore, the main shaft 20 cannot be rotated in the counterclockwise direction.

In contrast thereto, in a state shown by FIG. 3A, when the main shaft 20 is rotated in the counterclockwise direction (arrow mark CCW direction/draining operation direction) as shown by FIG. 3B, rotation of the handle 25 and the main shaft 20 in the counterclockwise direction (arrow mark CCW direction) is permitted until the second handle side rib 27 is butted to the rib 72 disposed in the counterclockwise direction to thereby carry out draining (water draining).

Further, although the case 15 is formed with the three ribs, the rib 73 which is not related to limit rotation is used for fixing the ring member 70 to the case 15.

Referring again to FIG. 1B, whereas a position detecting rib 61 for detecting a rotational position of the handle 25 and the main shaft 20 is formed on a lower end side of the spur gear 50, a photointerrupter 60 is arranged to a rotational region of the position detecting rib 61. Therefore, rotation of the main shaft 20 can be detected by way of the photointerrupter 60 and when the main shaft 20 is rotated in the cleaning direction, cleaning water is supplied into the toilet and inside of the toilet is cleaned in accordance with a constant sequence. For example, rim cleaning and jet cleaning are carried out by a predetermined pattern and inside of the toilet is cleaned efficiently.

Further, a coil spring 80 (urging device) for producing urge force for returning the main shaft 20 from the draining operation position to the cleaning operation position is installed between the case 15 and the ring member 30. Therefore, when the main shaft 20 is pulled out to the draining operation position and thereafter the hand is left from the handle 25, the main shaft 20 is automatically returned to the cleaning operation position by being pressed by the coil spring. At this occasion, impact sound is emitted and therefore, an operator can firmly be informed of returning of the main shaft 20 to the cleaning operation position.

(Operation and Method of Use)

The cleaning valve drive unit 10 is normally brought into the state shown by FIG. 2A and the main shaft 20 is disposed at the cleaning operation position. When cleaning at inside of the toilet is manually instructed under the state, the handle 25 is turned in the counterclockwise direction. As a result, rotation of the main shaft 20 is detected by the photointerrupter 60, the motor unit is rotated and the main shaft is driven by a constant sequence by the motor unit to thereby clean inside of the toilet.

In contrast thereto, in the state shown by FIG. 2A, when the handle 25 is intended to turn in the clockwise direction, the first handle side rib 26 is butted to the inner wall of the groove 41 of the holder 40 and therefore, the handle 25 cannot be rotated in the clockwise direction. Therefore, when inside of the toilet is cleaned, a draining mode is not erroneously constituted.

Further, when draining of the cleaning water supply apparatus is intended to carry out in winter season for preventing freezing, the handle 25 is pulled from the state shown in FIG. 2A to thereby shift the main shaft 20 to the draining operation position as shown by FIG. 3A. Under the state, engagement of the first handle side rib 26 and the groove 41 of the holder 40 is released and therefore, the handle 25 can be turned in the clockwise direction to reach the state of FIG. 3B. As a result, draining of the cleaning water supply apparatus can be carried out.

Further, after finishing to drain the apparatus, when the handle 25 is reversely rotated to return to a position at which the handle 25 is pulled out, the main shaft 20 is automatically returned to the cleaning operation position by being pressed by the coil spring 80 and therefore, thereafter, a state of carrying out normal cleaning operation is recovered.

In contrast thereto, in a state shown in FIG. 3A, even when the handle 25 is intended to turn in the counterclockwise direction, the second handle side rib is butted to the case side rib 71 and therefore, the handle 25 cannot be rotated in the counterclockwise direction.

Although according to the embodiment, cleaning operation is constituted by operation in the counterclockwise direction at the cleaning operation position and draining operation is constituted by operation in the clockwise direction at the position at which the main shaft 20 is pulled out from the cleaning operation position, when there is constructed a constitution in which whereas when the main shaft 20 is disposed at the cleaning operation position, water can be supplied to the toilet by rotational operation around an axis line with respect to the main shaft 20, draining operation is made to be unable to carry out with respect to the main shaft 20, when the main shaft 20 is moved to the draining operation position, draining is permitted by the rotational operation around the axis line with respect to the main shaft 20 and the cleaning operation is made to be unable to carry out with respect to the main shaft 20, a direction of rotating the handle 25 and the main shaft 20 in the cleaning operation and a direction of rotating the handle 25 and the main shaft 20 in the draining operation may be the same as each other.

Further, although according to the above-described embodiment, there is constructed a constitution of carrying out draining operation at the position at which the drain shaft 20 is pulled out from the cleaning operation position, there may be constructed a constitution of carrying out the draining operation at a position at which the main shaft 20 is pushed into the case 15 from the cleaning operation position.

Further, in the above-described embodiment, the position detecting rib 61 may directly be attached to the main shaft 20 separately from the spur gear 50. When constituted in this way, by adopting a constitution of releasing the spur gear 50 and the main shaft 20 from being brought in mesh with each other when the main shaft 20 is moved in the axial direction, operation of the handle 25 in the draining operation can be alleviated.

As has been explained above, according to the invention, draining operation for draining water cannot be carried out so far as operation of pulling out or operation of pushing the main shaft from the cleaning operation position in the axial direction is not carried out. Therefore, so far as the main shaft is disposed at the cleaning operation position, even when a person who does not know the method of use erroneously turn the handle, draining operation is not carried out and therefore, cleaning water is not left to flow.

What is claimed is:

1. A cleaning valve drive unit in a cleaning water supply apparatus which supplies water to a toilet, comprising:

a main shaft operated by a manual rotational operation, the main shaft being movable to a cleaning operation position and a draining operation position, wherein the draining operation position of the main shaft is axially shifted from the cleaning operation position in an axial direction of the main shaft; and an operation limiting mechanism for limiting the rotational operation of the main shaft, wherein the operation limiting mechanism includes a projection protecting from the main shaft and a limiting portion which limits rotation of the main shaft by engaging with the projection when the main shaft is in the cleaning operation position;

wherein when the main shaft is disposed at the cleaning operation position: (i) the operation limiting mechanism enables the main shaft to rotate by the rotational operation around an axis line of the main shaft to thereby clean the toilet: and (ii) the projection is disposed so as to engage the limiting portion so that a draining operation of the main shaft is not able to be carried out, and when the main shaft is disposed at the draining operation position, the projection formed on the main shaft is released from engagement with the limiting portion so that the operation limiting mechanism enables the main shaft to rotate by the rotational operation around the axis line of the main shaft to thereby drain water from the toilet.

2. The cleaning valve drive unit according to claim 1, wherein the operation limiting mechanism is configured so that the cleaning operation to the main shaft cannot be carried out when the main shaft is disposed at the draining operation position.

3. The cleaning valve driving unit according to claim 1, wherein the operation limiting mechanism includes a projection integrally rotated with the main shaft and a stopper for limiting rotation around the axis line of the main shaft in cooperation with the projection, and an operation other than a predetermined operation to the main shaft is limited by the projection and the stopper.

4. The cleaning valve unit according to claim 1, further comprising an urging device urging the main shaft in the axial direction thereof to thereby return the main shaft from the draining operation position to the cleaning operation position.

5. A cleaning valve drive unit in a cleaning water supply apparatus which supplies water to a toilet, comprising:
- a main shaft operated by a manual rotational operation, the main shaft being movable to a cleaning operation position and a draining operation position, wherein the draining operation position of the main shaft is axially shifted from the cleaning operation position in an axial direction of the main shaft; and
- means for limiting the rotational operation of the main shaft;
- wherein when the main shaft is disposed at the cleaning operation position, the means for limiting the rotational operation of the main shaft: (i) enables the main shaft to rotate in a direction around an axis line of the main shaft to a position in which the toilet is cleaned; and (ii) prevents the rotation of the main shaft in a direction around an axis line of the main shaft to a position in which a draining operation of the main shaft is carried out, and
- when the main shaft is disposed at the draining operation position, the means for limiting the rotational operation of the main shaft enables the main shaft to rotate in a direction around an axis line of the main shaft to a position which allows water to be drained from the toilet.

* * * * *